United States Patent
Rutledge et al.

(10) Patent No.: US 9,181,757 B2
(45) Date of Patent: Nov. 10, 2015

(54) SUCKER ROD APPARATUS AND METHOD

(75) Inventors: Russell P. Rutledge, Big Spring, TX (US); Russell P. Rutledge, Jr., Big Spring, TX (US); Ryan B. Rutledge, Big Spring, TX (US)

(73) Assignee: FINALROD IP, LLC, Big Spring, TX (US)

(*) Notice: Subject to any disclaimer, the term of this patent is extended or adjusted under 35 U.S.C. 154(b) by 861 days.

(21) Appl. No.: 13/385,410

(22) Filed: Feb. 17, 2012

(65) Prior Publication Data

US 2013/0039691 A1  Feb. 14, 2013

Related U.S. Application Data

(63) Continuation-in-part of application No. 13/136,715, filed on Aug. 9, 2011, now Pat. No. 8,851,162.

(51) Int. Cl.
*E21B 17/04* (2006.01)
*E21B 43/12* (2006.01)
*E21B 17/10* (2006.01)

(52) U.S. Cl.
CPC ............ *E21B 17/04* (2013.01); *E21B 17/1071* (2013.01); *E21B 43/127* (2013.01); *Y10T 403/47* (2015.01); *Y10T 403/473* (2015.01); *Y10T 403/7039* (2015.01)

(58) Field of Classification Search
None
See application file for complete search history.

(56) References Cited

U.S. PATENT DOCUMENTS

| | | |
|---|---|---|
| 4,401,396 A | 8/1983 | McKay |
| 4,475,839 A | 10/1984 | Strandberg |
| 4,585,368 A * | 4/1986 | Pagan ............ 403/266 |
| 4,653,953 A | 3/1987 | Anderson et al. |
| 4,662,774 A | 5/1987 | Morrow, Jr. |
| 4,822,201 A | 4/1989 | Iwasaki et al. |
| 4,919,560 A | 4/1990 | Rutledge, Jr. et al. |
| 5,253,946 A | 10/1993 | Watkins |
| 6,193,431 B1 | 2/2001 | Rutledge |
| 8,113,277 B2 | 2/2012 | Rutledge et al. |
| 2008/0219757 A1 | 9/2008 | Rutledge et al. |

OTHER PUBLICATIONS

PCT search report for PCT/US12/00347 dated Nov. 29, 2012 (26 pages).

* cited by examiner

*Primary Examiner* — Giovanna C Wright (57) ABSTRACT

The present disclosure relates to a fiberglass rod with connectors on each end. Each connector has a rod-receiving receptacle having an open end, a closed end, and axially spaced annular wedge shaped surfaces such that the compressive forces between the rod and the respective connector are defined by the shape of the wedged surfaces.

81 Claims, 6 Drawing Sheets

FIG. 12

SUCKER ROD APPARATUS AND METHOD

CROSS REFERENCE TO RELATED APPLICATION

The present application is a continuation-in-part application of the application of Russell P. Rutledge, Russell P. Rutledge, Jr. and Ryan B. Rutledge, U.S. Ser. No. 13/136,715, filed Aug. 9, 2011 now U.S. Pat. No. 8,851,162, entitled Sucker Rod Apparatus and Method.

FIELD

The present disclosure relates generally to oil well sucker rods. In particular, the disclosure relates to oil well sucker rods made of fiberglass with end fittings or connectors on each end and the manufacture thereof.

BRIEF DESCRIPTION OF THE DRAWINGS

The accompanying drawings, which are incorporated in and constitute a part of the specification, illustrate preferred embodiments of the disclosure and together with the general description of the disclosure and the detailed description of the preferred embodiments given below, serve to explain the principles of the disclosure.

The depicted embodiments of the sucker rod and associated connectors are described below with reference to the listed Figures.

The above general description and the following detailed description are merely illustrative of the generic disclosure, and additional modes, advantages, and particulars of this disclosure will be readily suggested to those skilled in the art without departing from the spirit and scope of the disclosure.

DETAILED DESCRIPTION OF THE EMBODIMENTS

In many oil wells, the pressure in the oil reservoir is not sufficient to lift the oil to the surface. In such cases, it is conventional to use a sub-surface pump to force the oil from the well. A pumping unit located at the surface drives the sub-surface pump. The pumping unit is connected to the sub-surface pump by a string of sucker rods. The pumping unit moves the sucker rod string up and down to drive the sub-surface pump.

Originally, a sucker rod was a special steel pumping rod. A sucker rod is, typically, a steel rod that is used to make up the mechanical assembly between the surface and the down hole components of a rod pumping system. Several sucker rods were screwed together to make up the mechanical link, or sucker rod string, from a beam-pumping unit on the surface to the subsurface pump at the bottom of a well. The sucker rods were threaded on each end and manufactured to dimension standards and metal specifications set by the petroleum industry. Typically, sucker rods have been in the lengths of 25 or 30 feet (7.6 or 9.1 meters), and the diameter varies from ½ to 1⅛ inches (12 to 30 millimeters).

Thus, sucker rod pumping is a method of artificial lift in which a subsurface pump located at or near the bottom of the well and connected to a string of sucker rods is used to lift the well fluid to the surface. The weight of the rod string and fluid is counterbalanced by weights attached to a reciprocating beam or to the crank member of a beam-pumping unit or by air pressure in a cylinder attached to the beam.

Due to the heavy weight of the steel sucker rods, large pumping units were required and pumping depths were limited. It is now preferable to use sucker rods made of fiberglass with steel connectors. The fiberglass sucker rods provide sufficient strength, and weigh substantially less than steel rods.

Since the development of the fiberglass sucker rod, there have been continued efforts to improve the sucker rod, and particularly, the relationship between the steel connectors and the successive rods.

Figure 1:
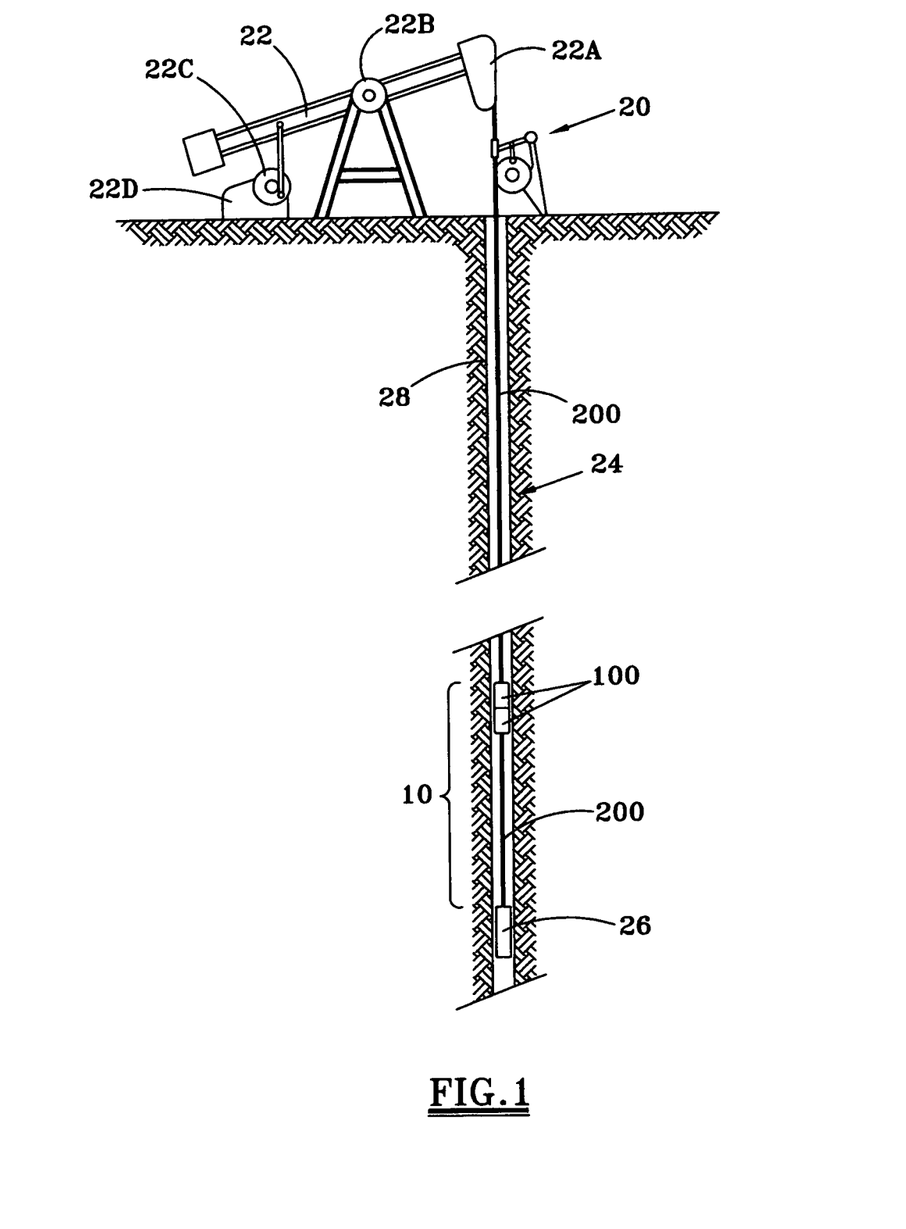
FIG. 1 illustrates a typical pumping system for use with the technology of the present disclosure.

FIG. 1 illustrates a generic pumping system 20. The pumping system 20 includes a pump drive 22, which is a conventional beam pump, or pump jack and is connected to a down hole pump 26 through a sucker rod string 24 inserted into wellbore 28. The sucker rod string 24 can comprise a continuous sucker rod 10, which extends from the down hole pump 26 to the pumping system 20, a series of connected sucker rods 10, a series of conventional length rods connected together, or any combination thereof. The pump drive 22 includes a horsehead 22A, a beam 22B, a gearbox 22c and a motor 22D. Preferably, the sucker rod 10 is a fiberglass, composite or rod having similar characteristics. As described herein, the sucker rod string 24 may be the same as the continuous sucker rod 10 when the continuous sucker rod 10 is a one-piece rod that extends substantially between the pump drive 22 and the sub-surface pump 26.

Figure 2:
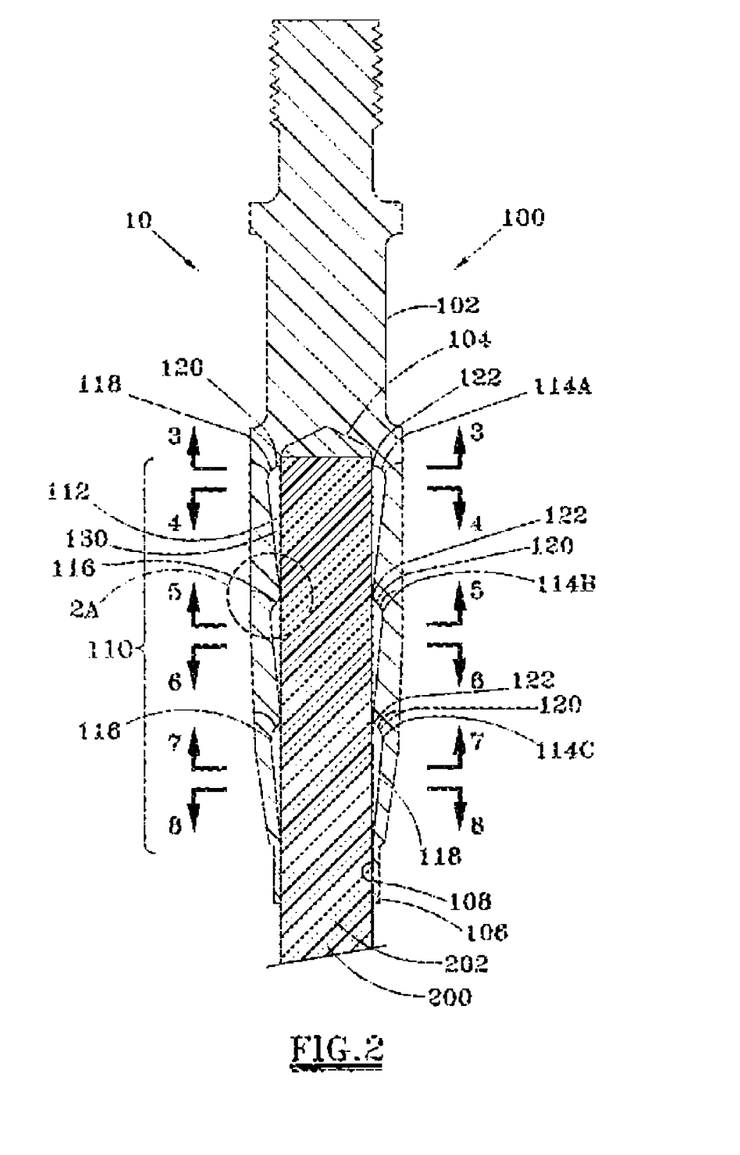
FIG. 2 is a cross-sectional view of an embodiment of a sucker rod and an associated end fitting within the scope of the present disclosure.

FIG. 2 is a cross-sectional view of an embodiment of the sucker rod 10 comprising a fiber composite rod 200 and associated end fitting 100 within the scope of the present disclosure. The sucker rod 10 comprises one or more end fittings 100 and the fiber composite rod 200. The fiber composite rod 200 has a first end 202 and a second end (not illustrated).

Typically, there are end fittings 100 on each end of the fiber composite rod 200 for coupling together a plurality of fiber composite rods 200. The end fitting 100 comprises an exterior surface 102, a closed end 104, an open end 106, and an interior surface 108. The interior surface 108 comprises a wedge system 110. The present disclosure provides that the wedge system 110 can have any number of wedges from one to multiple wedges. The embodiment illustrated in FIG. 2 has three wedges. The wedge system 110 defines a cavity 112 in the end fitting 100 for receiving the fiber composite rod 200.

Further, the wedge system 110 comprises a plurality of wedged-shaped portions 114. Each wedged-shaped portion 114 has an apogee 116, a perigee 124, a leading edge 118 and a trailing edge 120 extending from and between the apogee 116 and the perigee 124. Each apogee 116 forms a perimeter 122 within the cavity 112 that is the narrowest part of the cavity 112 associated with each wedge shaped portion 114. Each perigee 124 is the widest part of the cavity 112 associated with each wedge shaped portion 114. The leading edge 118 is longer than the trailing edge 120 with the leading edge 118 facing the open end 106 and the trailing edge 120 facing the closed end 104 with respect to each wedge shaped portion 114 of the end fitting 100.

The first wedge shaped portion 114A is proximate to the closed end 104 for receiving compressive forces that are greater than the compressive forces associated with the other wedged-shaped portions 114B, 114C. Particularly, the first wedged-shaped portion 114A receives greater compressive forces than the compressive force for which a second wedge shaped portion 114B receives that is proximate to the first wedged-shaped portion 114A. A third wedge shaped portion 114C between the second wedge shaped portion 114B and the open end 106 receives compressive forces that are less than the compressive forces associated with the first and second wedge shaped portions 114A, 114C. Therefore, the compressive forces create a force differential along each wedge shaped portion 114 greater at the closed end 104 of the end fitting 100 and decreasing toward the open end 106 of the end fitting 100.

As the compressive forces associated with the first wedged-shaped portion 114A deteriorate the structural integrity of the first wedged-shaped portion 114A, then, it has been found that the uncompensated for compressive forces of the first wedged-shaped portion 114A are transferred to and accepted by the second wedged-shaped portion 114B. Similarly, as the compressive forces associated with the second wedged-shaped portion 114B deteriorate the structural integrity of the second wedged-shaped portion 114B, then it has been found that the uncompensated for compressive forces of the second wedged-shaped portion 114B are transferred to and accepted by the third wedged-shaped portion 114C.

Thus, a force transfer continuum is created by the wedge system 110. The force transfer continuum provides for a constant effectiveness between the end fitting 100 and the fiber composite rod 200 as the wedge system 110 deteriorates from one wedged-shaped portion 114 to the next wedged-shaped portion 114 of the wedge system 110. The present structure of the sucker rod 10 including specifically the end fitting 100 does not distribute the compressive forces throughout the end fitting 100, but rather focuses the compressive forces on each wedge shaped portion 114 of the wedge system 110 of the present disclosure.

The sucker rod 10 has a plurality of longitudinal cross-sections of the wedged-shaped portions 114, which forms a plurality of frustro-conical shapes within the cavity 112.

The wedge shaped portions 114 of the sucker rod 10 create different compressive forces on each respective edge 118, 120 thereof with the compressive force being approximately proportional to a length of each edge 118, 120. In one embodiment, the compressive force on each edge 118, 120 is directly proportional to the length of each edge 118, 120. Further, the plurality of wedge shaped portions 114 are determined by the angles associated between the leading edge 118 and the trailing edge 120.

An adhesive or epoxy 130 is used to sufficiently bond with the fiber composite rod 200 and engage with the end fitting 100. It is appreciated that any adhesive substance that will sufficiently bond with the fiber composite rod 200 and engage with the end fitting 100 may be used. The adhesive or epoxy 130 is placed in the cavity 112 and cured to bond with the fiber composite rod 200 in the cavity 112 for fixedly securing the end fitting 100 with the fiber composite rod 200.

Figure 2A:
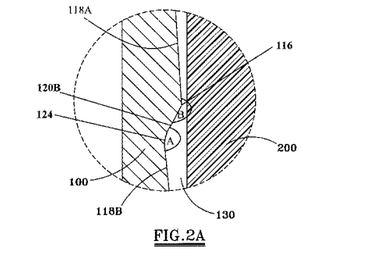
FIG. 2A is an exploded view of the blow-up section 2A as illustrated in FIG. 2 illustrating the angles between the leading edge and the trailing edge of a wedged-shaped portions of the wedge system.

FIG. 2A is an exploded view of the blow-up section 2A as illustrated in FIG. 2 illustrating the angles between the leading edge and the trailing edge of a wedged-shaped portion of the wedge system. In one embodiment, the angle A between the leading edge 118 and the trailing edge 120 of each wedge shaped portion is obtuse having an angle greater than 90 degrees. FIG. 2 illustrates an angle A associated with each wedged-shaped portion 114 of the wedge system 110.

FIG. 2A is an exploded view of the blow-up section 2A as illustrated in FIG. 2 illustrating the angles between the leading edge 118B and the trailing edge 120B of a wedged-shaped portion 114B of the wedge system 110. The fiber composite rod 200 is illustrated in the end fitting 100. The end fitting 100 defines the leading edge 118B and the trailing edge 120B to form the cavity 112 to be filled by the epoxy 130. The angle between the leading edge 118B and the trailing edge 120B defines the angle A. The angle A is obtuse having an angle greater than 90 degrees. Generally, the leading edge 118, the trailing edge 120 and the fiber composite rod 200 form a scalene triangle with the longest side of the scalene triangle being along the fiber composite rod 200, the shortest side of the scalene triangle being along the trailing edge 120, and the intermediate side of the scalene triangle being along the leading edge 118.

FIG. 2A also illustrates the angle B between the trailing edge 120B of the wedge shaped portion 114B and the leading edge 118A of the wedge shaped portion 114A. Thus, the angle B defines the relationship between the trailing edge 120 of the wedge shaped portion 114 and the leading edge 118 of an adjacent wedge shaped portion 114. The angle B is a reflex angle. A reflex angle is an angle that exceeds 180 degrees.

Figure 3:
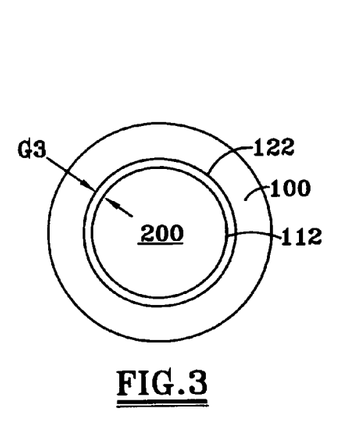
FIG. 3 is a sectional view of the sucker rod and end fitting combination illustrated in FIG. 2 taken along the section line 3-3.

FIG. 3 is a sectional view of the fiber composite rod 200 and end fitting 100 combination illustrated in FIG. 2 taken along the section line 3-3. The end fitting 100 is exterior of the fiber composite rod 200 with the cavity 112 there between. The cavity 112 between the fiber composite rod 200 and the end fitting 100 forms a gap G3. It is appreciated with respect to practicing the innovation of the present disclosure that the gap can be of any dimension, for example, from as small as zero or no gap to as large a gap as required to achieve the efficacy of the present disclosure.

Figure 4:
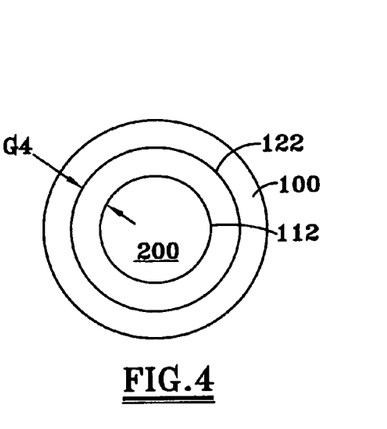
FIG. 4 is a sectional view of the sucker rod and end fitting combination illustrated in FIG. 2 taken along the section line 4-4.

FIG. 4 is a sectional view of the fiber composite rod 200 and end fitting 100 combination illustrated in FIG. 2 taken along the section line 4-4. The end fitting 100 is exterior of the fiber composite rod 200 with the cavity 112 there between.

The cavity 112 between the fiber composite rod 200 and the end fitting 100 forms a gap G4. The gaps G3 and G4 are associated with the first wedged-shaped portion 114A of the wedge system 110.

Figure 5:
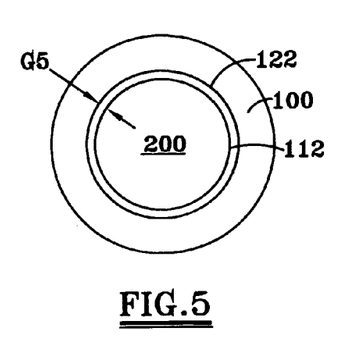
FIG. 5 is a sectional view of the sucker rod and end fitting combination illustrated in FIG. 2 taken along the section line 5-5.

FIG. 5 is a sectional view of the fiber composite rod 200 and end fitting 100 combination illustrated in FIG. 2 taken along the section line 5-5. The end fitting 100 is exterior of the fiber composite rod 200 with the cavity 112 there between. The cavity 112 between the fiber composite rod 200 and the end fitting 100 forms a gap G5.

Figure 6:
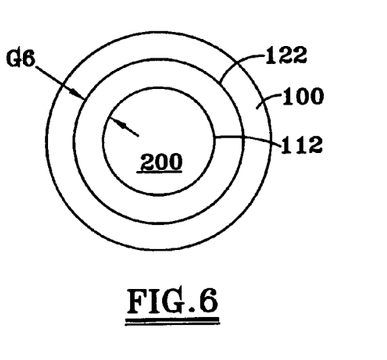
FIG. 6 is a sectional view of the sucker rod and end fitting combination illustrated in FIG. 2 taken along the section line 6-6.

FIG. 6 is a sectional view of the fiber composite rod 200 and end fitting 100 combination illustrated in FIG. 2 taken along the section line 6-6. The end fitting 100 is exterior of the fiber composite rod 200 with the cavity 112 there between. The cavity 112 between the fiber composite rod 200 and the end fitting 100 forms a gap G6. The gaps G5 and G6 are associated with the second wedged-shaped portion 114B of the wedge system 110.

Figure 7:
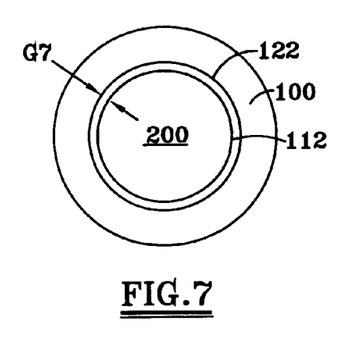
FIG. 7 is a sectional view of the sucker rod and end fitting combination illustrated in FIG. 2 taken along the section line 7-7.

FIG. 7 is a sectional view of the fiber composite rod 200 and end fitting 100 combination illustrated in FIG. 2 taken along the section line 7-7. The end fitting 100 is exterior of the fiber composite rod 200 with the cavity 112 there between. The cavity 112 between the fiber composite rod 200 and the end fitting 100 forms a gap G7.

Figure 8:
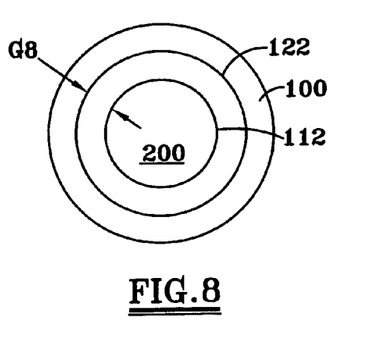
FIG. 8 is a sectional view of the sucker rod and end fitting combination illustrated in FIG. 2 taken along the section line 8-8.

FIG. 8 is a sectional view of the fiber composite rod 200 and end fitting 100 combination illustrated in FIG. 2 taken along the section line 8-8. The end fitting 100 is exterior of the fiber composite rod 200 with the cavity 112 there between. The cavity 112 between the fiber composite rod 200 and the end fitting 100 forms a gap G8. The gaps G7 and G8 are associated with the second wedged-shaped portion 114C of the wedge system 110.

Figure 10:
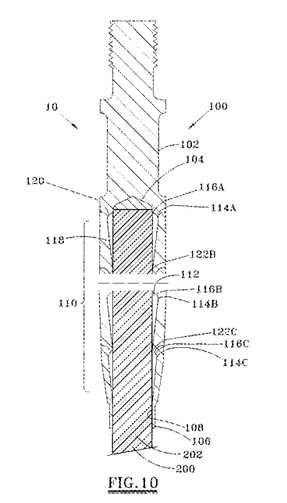
FIG. 10 is a cross-sectional view of another embodiment of a sucker rod and an associated end fitting within the scope of the present disclosure.
Figure 11:
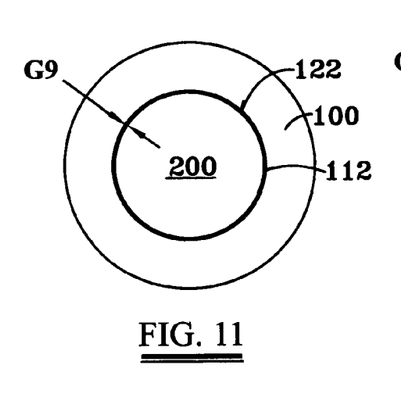
FIG. 11 is a sectional view of the sucker rod and end fitting combination illustrated in FIG. 10 taken along the apogee of one of the wedge portions of the wedge system within the scope of the present disclosure.

FIG. 11 is a sectional view of the sucker rod 10 including the end fitting 100 combination illustrated in FIG. 10 taken along the apogee 116 of one of the wedge portions 114 of the wedge system 110 within the scope of the present disclosure. The end fitting 100 is exterior of and engaged with the fiber composite rod 200 with no cavity 112 there between. The lack of a cavity 112 between the fiber composite rod 200 and the end fitting 100 forms a zero gap G9. It is appreciated with respect to practicing the innovation of the present disclosure that the gap can be of any dimension, for example, from as small as zero or no gap, as illustrated in FIG. 11, to as large a gap as required to achieve the efficacy of the present disclosure.

Figure 12:
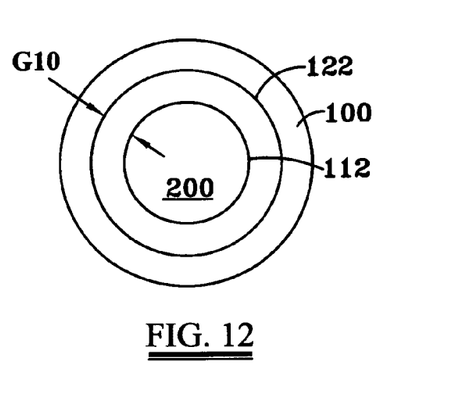
FIG. 12 is a sectional view of the sucker rod and end fitting combination illustrated in FIG. 10 taken along the vortex of the wedge portion of the wedge system illustrated in FIG. 11 within the scope of the present disclosure.

FIG. 12 is a sectional view of the sucker rod 10 and including the end fitting 100 combination illustrated in FIG. 10 taken along the vortex 124 of the wedge portion 114 of the wedge system 110 illustrated in FIG. 11 within the scope of the present disclosure. The end fitting 100 is exterior of the fiber composite rod 200 with the cavity 112 there between. The cavity 112 between the fiber composite rod 200 and the end fitting 100 forms a gap G10. It is appreciated with respect to practicing the innovation of the present disclosure that the gap can be of any dimension, for example, from as small as zero or no gap to as large a gap as required to achieve the efficacy of the present disclosure.

The smaller gaps G3, G5, G7, G9 associated with each wedged-shaped portion 114 are substantially constant having essentially the same dimension. Similarly, the larger gaps G4, G6, G8, G10 associated with each wedged-shaped portion 114 are substantially constant having essentially the same dimension. The symmetry provided by the relationship of the minimum gaps G3, G5, G7, G9 and the maximum gaps G4, G6, G8, G10 provides unforeseen results. Particularly, the symmetry provided by the relationship of the minimum gaps G3, G5, G7, G9 and the maximum gaps G4, G6, G8, G10 greatly enhances the stability and ability of the fiber composite rod 200 and end fitting 100 combination to accept enhanced compressive and back pressure forces associated with the reciprocating environment in which the sucker rods 10 are used.

Figure 9:
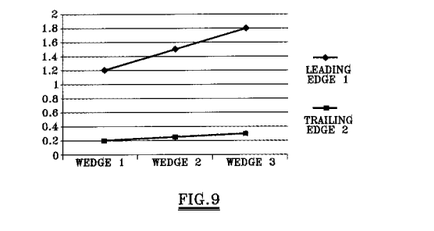
FIG. 9 is a graph of the relationship between the length on the ordinate of the leading edge and trailing edge of each wedged-shaped portion on the abscissa in the wedge system of the present disclosure.

FIG. 9 is a graph of the relationship between the length on the ordinate (x-axis) of the leading edge 118 and the trailing edge 120 of each wedged-shaped portion 114 on the abscissa (y-axis) in the wedge system 110 of the present disclosure. As illustrated in FIG. 2, the leading edge 118 is progressively longer from the closed end 104 of the end fitting 100 to the open end 106 of the end fitting 100. Similarly, the trailing edge 120 is progressively longer from the closed end 104 of the end fitting 100 to the open end 106 of the end fitting 100. The functions defined by these relationships are illustrated in FIG. 9. Particularly, a line having a slope or gradient defines the function associated with the trailing edge 120, and a line having a slope or gradient defines the function associated with the leading edge 118.

The relationship of the function associated with the trailing edge 120 and the function associated with the leading edge 118 provides insight to the unforeseen effectiveness of the wedge system 110 of the present disclosure. It has been found that the rate of increase of the length of the leading edge 118 with respect to the rate of increase of the length of the trailing edge 120, as defined by the slope or gradient of each associated function, provides an enhanced sucker rod 10 and sucker rod system. The slope of the leading edge 118 associated with the wedge system 110 of the present disclosure is greater than the slope of the trailing edge 120 associated with the wedge system 110 of the present disclosure.

The wedge system 110 of the present disclosure as applied to a sucker rod 10 provides unforeseen effectiveness not before appreciated. The combination of the wedged-shaped portions 114, the relationship of the leading edge 118 to the trailing edge 120, the symmetry of the minimum gaps G3, G5, G7, G9 and the maximum gaps G4, G6, G8, G10 result in a wedge system 110 that provides improved and unpredicted functionality. Particularly, the improved and unpredicted functionality of the sucker rod 10 having the wedge system 110 of the present disclosure greatly enhances the stability of the sucker rod 10 and ability of the fiber composite rod 200 and end fitting 100 combination to accept enhanced compressive and back pressure forces associated with the reciprocating environment in which the sucker rods 10 are used.

The change of the length of the leading edge increases from the inner wedge to the outer wedge. However, the rate of change of the length of the leading edge is greater than the rate of change of the trailing edge. This is evidenced by the slope of the line for the leading edge 1 and the slope of the line for the trailing edge 2 illustrated in FIG. 9. For another example, if the slope of the line representing the trailing edge was 1, then the line would be horizontal in FIG. 9. Then, the slope of the line representing the leading edge would be any value greater than 1, and would be angled upward from left to right in FIG. 9.

It has not been know before that such an arrangement would provide the unexpected results achieved by the present disclosure. Particularly, the unexpected results achieved by the present end fitting design distributes the stresses to the interior wedge first, and thereafter to the next successive wedges in the wedge system. The prior art teaches away from achieving such results. The prior art describes wedge systems that distribute the stresses along the entire length of the wedge system.

Further, the relationship of the rate of change of the lengths of the leading edge to the trailing edge illustrated in FIG. 9 is not described in or anticipated by the prior art. The increased rate of change of the length of the leading edge relative to the trailing edge provides enhanced and unexpected characteristics with respect to the effectiveness of the end fitting of the present disclosure. Particularly, the present end fitting design concentrates the compressive forces in the strongest part of the end fitting, the interior wedge. Thus, there is an increased cohesion between the end fitting and the rod. This results in a more secure engagement of the rod within the end fitting. Still further, this results in reduced strain or deformation as a result of the forces caused by stress associated with the use of the fiberglass rod.

FIG. 10 is a cross-sectional view of another embodiment of a sucker rod 10 and associated end fitting 100 within the scope of the present disclosure. The sucker rod 10 comprises one or more end fittings 100 and a fiber composite rod 200. The fiber composite rod 200 has a first end 202 and a second end (not illustrated).

Typically, there are end fittings 100 on each end of the fiber composite rod 200 for coupling together a plurality of fiber composite rods 200. The end fitting 100 comprises an exterior surface 102, a closed end 104, an open end 106, and an interior surface 108. The interior surface 108 comprises a wedge system 110. The present disclosure provides that the wedge system 110 can have any number of wedges as indicated by the broken line between the first wedged-shaped portion 114A and the second wedged-shaped portion 114B. The wedge system 110 defines a cavity 112 in the end fitting 100.

The wedge system 110 comprises a plurality of wedged-shaped portions 114. Each wedged-shaped portion 114 has an apogee 116, a perigee 124, a leading edge 118 and a trailing edge 120 extending from the apogee 116 and/or the perigee 124. Each apogee 116 forms a perimeter 122 within the cavity 112 that is the narrowest part of the cavity 112 associated with each wedge shaped portion 114. Each perigee 124 forms the widest portion of the cavity 112 associated with each wedge shaped portion 114. The leading edge 118 is longer than the trailing edge 120 with the leading edge 118 facing the open end 106 and the trailing edge 120 facing the closed end 104 with respect to each wedge shaped portion 114.

The first wedge shaped portion 114A is proximate to the closed end 104 for receiving compressive forces that are greater than the compressive forces associated with the other wedged-shaped portions 114B, C, etc. Particularly, the first wedged-shaped portion 114A receives greater compressive forces than the compressive forces for which a second wedge shaped portion 114B receives that is proximate to the first wedged-shaped portion 114A. A third wedge shaped portion 114C between the second wedge shaped portions 114B and the open end 106 receives compressive forces that are less than the compressive forces associated with the first and second wedge shaped portions 114A, 114C. Therefore, the compressive forces create a force differential along each wedge shaped portion 114 greater at the closed end 104 of the end fitting 100 and decreasing toward the open end 106 of the end fitting 100.

As the compressive forces associated with the first wedged-shaped portion 114A deteriorate the structural integrity of the first wedged-shaped portion 114A, then it has been found that the uncompensated for compressive forces of the first wedged-shaped portion 114A are transferred to and accepted by the second wedged-shaped portion 114B. Similarly, as the compressive forces associated with the second wedged-shaped portion 114B deteriorate the structural integrity of the second wedged-shaped portion 114B, then it has been found that the uncompensated for compressive forces of the second wedged-shaped portion 114B are transferred to and accepted by the third wedged-shaped portion 114C.

Thus, a force transfer continuum is created by the wedge system 110 regardless of the number of wedged-shaped portions 114 comprise the wedge system 110. The force transfer continuum provides for a constant effectiveness between the end fitting 100 and the fiber composite rod 200 as the wedge system 110 deteriorates from one wedged-shaped portion 114 to the next wedged-shaped portion 114 of the wedge system 110.

The wedge shaped portions 114 of the sucker rod 50 create different compressive forces on each respective edge 118, 120 thereof with the compressive force being approximately proportional to a length of each edge 118, 120. In one embodiment, the compressive force on each edge 118, 120 is directly proportional to the length of each edge 118, 120. Further, the plurality of wedge shaped portions 114 are determined by the angles associated between the leading edge 118 and the trailing edge 120.

An adhesive or epoxy 130 is used to sufficiently bond with the fiber composite rod 200 and for engagement with the end fitting 100. It is appreciated that any adhesive substance that will sufficiently bond with the fiber composite rod 200 and engage with the end fitting 100 may be used. The adhesive or epoxy 130 is placed in the cavity 112 and cured to bond with the fiber composite rod 200 in the cavity 112 for fixedly securing the end fitting 100 with the fiber composite rod 200.

In another embodiment, the angle A between the leading edge 118 and the trailing edge 120 of each wedge shaped portion is obtuse. FIG. 2A illustrates an angle A associated with each wedged-shaped portion 114 of the wedge system 110 with respect to the present disclosure. FIG. 2A also illustrates the angle B between the trailing edge 120B of the wedge shaped portion 114B and the leading edge 118A of the wedge shaped portion 114A. Thus, the angle B defines the relationship between the trailing edge 120 of the wedge shaped portion 114 and the leading edge 118 of an adjacent wedge shaped portion 114. The angle B is a reflex angle. A reflex angle is an angle that exceeds 180 degrees.

The longitudinal cross sections of the concaved portions 110 form frustro-conical shapes. The concaved portions 110 create different compressive forces on each respective surface thereof with the compressive force being approximately proportional to the length of each surface. The compressive force on each surface increases toward the closed end 104 and decreases toward the open end 106. The compressive force on each first surface 118 is proportional to the length of each surface. The compressive force on each second surface 120 is proportional to the length of each second surface.

The plurality of concaved portions 110 are determined by the angle associated between the first surface 118 and the second surface 120 of each concaved surface 110. The angle between the first surface 118 and the second surface 120 of each concaved surface 110 is obtuse. Further, each wedge shape portion 114 may have a length proportional to the compressive force applied to the wedge shape 114. The wedge shape 114 has a length that increases from the closed end 104 to the open end 106 of the end fitting 100. The wedge shaped portions 114 may have a length that decreases from the closed end 104 to the open end 106 of the end fitting 100.

In yet another embodiment, a method for manufacturing a sucker rod is provided. The method comprises the steps of constructing an end fitting comprising an exterior surface, a closed end, an open end, and an interior surface. The interior surface comprises at least three wedge shaped portions defining a cavity. The wedge shaped portions have an apogee and a first and second length extending from the apogee. The apogee forms a perimeter that is the narrowest part of the cavity associated with each wedge shaped portion such that the first length is longer than the second length with the first length facing the open end and the second length facing the closed end with respect to each wedge shaped portion. The method further comprises engaging an end of a fiber composite rod into the cavity of the end fitting for creating a void between the fiber composite rod and the wedge shaped portions of the end fitting. Thereafter, injecting an epoxy into the void to bond with the fiber composite rod and to fixedly engage the wedge shaped portions of the end fitting for securing the end fitting to the fiber composite rod. This arrangement causes the stress to increase the elastic limit without permanent alteration of the fiber composite rod and epoxy combination in the cavity of the end fitting.

Thus, a first wedge shaped portion proximate to the closed end receives compressive forces that are greater than the compressive forces for which a second wedge shaped portion proximate to the open end receives, and an intermediate wedge shaped portion between the first and second wedge shaped portions for receiving compressive forces that are intermediate of the first and second wedge shaped portions. Such that the compressive forces create a force differential along the wedge shaped portion greater at the closed end of the fitting and decreasing toward the open end of the fitting.

The method for manufacturing a sucker rod may further comprise the step of creating different compressive forces on each respective surface of the wedge shaped portions with the compressive force being approximately proportional to the length of each surface.

Further, the method for manufacturing a sucker rod may comprise the step of the compressive force on each surface increasing toward the closed end and decreasing toward the open end.

Still further, the method for manufacturing a sucker rod may comprise the compressive force on each first surface being proportional to the length of each surface.

Yet still further, the method for manufacturing a sucker rod may comprise the compressive force on each second surface being proportional to the length of each second surface.

The method for manufacturing a sucker rod may comprise the plurality of wedge shaped portions being determined by the angle associated between the first surface and the second surface of each concaved surface. The method for manufacturing a sucker rod may have the angle between the first surface and the second surface of each concaved surface being obtuse.

The method for manufacturing a sucker rod wherein each wedge shape has a length proportional to the compressive force applied to the wedge shape. The method for manufacturing a sucker rod wherein each wedge shape has a length that increases from the closed end to the open end of the end fitting. The method for manufacturing a sucker rod wherein each wedge shape has a length that decreases from the closed end to the open end of the end fitting.

The relationship of the stress verses the strain with respect to the effect on the elastic limit within the scope of the present disclosure is unique. The yield strength or yield point of a material is defined in engineering and materials science as the stress at which a material begins to deform plastically. Prior to the yield point, the material will deform elastically and will return to its original shape when the applied stress is removed. Once the yield point is passed some fraction thereof, the deformation will be permanent and non-reversible.

Knowledge of the yield point is vital when designing a component since it generally represents an upper limit to the load that can be applied. It is also important for the control of many materials production techniques such as forging, rolling, or pressing. In structural engineering, this is a soft failure mode that does not normally cause catastrophic failure or ultimate failure unless it accelerates buckling. It is often difficult to precisely define yielding due to the wide variety of stress-curves exhibited by real materials. In addition, there are several possible ways to define yielding.

True elastic limit is the lowest stress at which dislocations move. This definition is rarely used, since dislocations move at very low stresses, and detecting such movement is very difficult. The proportionality limit is an amount of stress that is proportional to strain (i.e., Hooke's law), so a stress-strain graph is a straight line, and the gradient will be equal to the elastic modulus of the material.

Elastic limit (yield strength) is the elastic limit, where permanent deformation will occur. The lowest stress at which permanent deformation can be measured. This requires a manual load-unload procedure, and the accuracy is critically dependent on equipment and operator skill. For elastomers, such as rubber, the elastic limit is much larger than the proportionality limit. Also, precise strain measurements have shown that plastic strain begins at low stresses. The yield point is the point in the stress-strain curve at which the curve levels off and plastic deformation begins to occur.

The relationship of the stress verses the strain with respect to the enhanced strain achieved with the present disclosure exceeds that of prior known devices. The structure of the present disclosure achieves the ability to receive and adapt to enhanced stress. The ability to receive and accommodate the enhanced amounts of stress provides for enhanced strain characteristics.

The invention has been shown in several of its embodiments. It should be apparent to those skilled in the art that the invention is not so limited, but is susceptible to various changes and modifications without departing from the spirit of the invention.

It is understood that the steps of the method described above or as claimed is not required to be performed in the order as disclosed. It is further understood that not all of the steps are necessary to carry out the claimed method and different embodiments of the method may not use all of the steps as disclosed above.

While the present disclosure has been described with emphasis on certain embodiments, it should be understood that within the scope of the appended claims, the present locating sub system and method could be practiced other than as specifically described herein. Thus, additional advantages and modification will readily occur to those skilled in the art. The disclosure in its broader aspects is therefore not limited to the specific details, representative apparatus, and the illustrative examples shown and described herein. Accordingly, the departures may be made from the details without departing from the spirit or scope of the disclosed general inventive concept.

What is claimed is:

1. An end fitting for a sucker rod comprising:
an exterior surface, a closed end, an open end, and an interior surface,
the interior surface comprising a wedge system defining a cavity, wherein the wedge system comprises at least one wedge shaped portion having an arcuate apogee, a perigee, a leading edge and a trailing edge, each apogee forming an arcuate perimeter of equal dimension within the cavity that is the narrowest part of the cavity associated with each wedge shaped portion, each perigee forming a perimeter of equal dimension within the cavity that is the widest part of the cavity associated with each wedge shaped portion such that the leading edge is longer than the trailing edge with the leading edge facing the open end and the trailing edge facing the closed end with respect to each wedge shaped portion, such that a force differential along the wedge system is created having compressive forces greater at the closed end of the fitting and decreasing toward the open end of the fitting.

2. The end fitting of claim 1, wherein the wedge system creates different compressive forces on each respective wedge shaped portion thereof with the compressive force being inversely proportional to a length of each leading edge.

3. The end fitting of claim 1, wherein the wedge shaped portion proximate to the closed end receives compressive forces that are greater than the compressive forces received by an adjacent wedge shaped portion.

4. The end fitting of claim 1, wherein the wedge shaped portions are determined by an angle associated with the apogee and the perigee between the leading edge and the trailing edge.

5. The end fitting of claim 4, wherein the arcuate apogee of the at least one wedge shaped portion defines a reflex angle.

6. The end fitting of claim 4, wherein the perigee of the at least one wedge shaped portion defines an obtuse angle.

7. The end fitting of claim 1, wherein the leading edge is shorter at the closed end and increases progressively from the closed end to the open end thereby compensating for the compression of the sucker rod in the end fitting, and the trailing edge is shorter at the closed end and increases progressively from the closed end to the open end thereby compensating for the back pressure associated with the sucker rod in the end fitting.

8. The end fitting of claim 1, further comprising a fiber composite rod having an end engaged centrally within the end fitting.

9. The end fitting of claim 8, wherein the fiber composite rod engages the arcuate perimeter of the apogee.

10. The end fitting of claim 8, further comprising a second end fitting engaged with a second end of the fiber composite rod.

11. The end fitting of claim 8, further comprising an epoxy placed in the cavity for bonding with the fiber composite rod in the cavity for fixedly securing the end fitting with the fiber composite rod.

12. The end fitting of claim 11, wherein the epoxy is uniform in thickness between the wedge shaped portions and the fiber composite rod such that the maximum thickness and the minimum thickness are constant.

13. The end fitting of claim 8, further comprising a beveled recess in the closed end for accepting and centrally aligning the fiber composite rod within the end fitting.

14. The end fitting of claim 1, wherein the first wedge shaped portion is proximate to the closed end and receives compressive forces that are greater than the compressive forces which a second wedge shaped portion receives, the second wedge shaped portion receives compressive forces that are greater than the compressive forces which a third wedge shaped portion receives, and wherein the third wedge shaped portion is closer to the open end than the second wedge shaped portion.

15. A sucker rod comprising:
a fiber composite rod having a first end and a second end; and
end fittings on each end of the fiber composite rod for coupling together a plurality of fiber composite rods, the end fitting comprising:
an exterior surface, a closed end, an open end, and an interior surface, wherein the interior surface comprises a wedge system defining a cavity, wherein the wedge system comprises at least one wedge shaped portion having an arcuate apogee, a perigee, a leading edge and a trailing edge, each apogee forming an arcuate perimeter of equal dimension within the cavity that is the narrowest part of the cavity associated with each wedge shaped portion, each perigee forming a perimeter of equal dimension within the cavity that is the widest part of the cavity associated with each wedge shaped portion, such that the leading edge is longer than the trailing edge with the leading edge facing the open end and the trailing edge facing the closed end with respect to each wedge shaped portion,
wherein the leading edge is shorter at the closed end and increases progressively from the closed end to the open end thereby compensating for the compression of the sucker rod in the end fitting, wherein the trailing edge is shorter at the closed end and increases progressively from the closed end to the open end thereby compensating for the back pressure associated with the sucker rod in the end fitting, and
wherein the ratio of the trailing edge to the leading edge of the interior wedge shaped portion is larger than the ratio of the trailing edge to the leading edge of each subsequent adjacent trailing edge to leading edge ratio, such that a force differential along the wedge system is created having compressive forces greater at the closed end of the fitting and decreasing toward the open end of the fitting.

16. The sucker rod of claim 15, wherein the wedge system creates different compressive forces on each respective wedge shaped portion thereof with the compressive force being inversely proportional to a length of each leading edge.

17. The sucker rod of claim 15, wherein the wedge shaped portions are determined by an angle associated with the apogee or the perigee between the leading edge and the trailing edge.

18. The sucker rod of claim 17, wherein the angle between the leading edge and the trailing edge of each concaved surface is obtuse.

19. The sucker rod of claim 15, wherein the fiber composite rod has each end engaged centrally within the end fitting.

20. The sucker rod of claim 19, further comprising an epoxy placed in the cavity for bonding with the fiber composite rod in the cavity for fixedly securing the end fitting with the fiber composite rod.

21. The sucker rod of claim 20, wherein the epoxy is uniform in thickness between the wedge shaped portions and the fiber composite rod such that the maximum thickness and the minimum thickness are constant.

22. The sucker rod of claim 19, further comprising a beveled recess in the closed end for accepting and centrally aligning the fiber composite rod within the end fitting.

23. A method for manufacturing a sucker rod comprising the steps of:
constructing an end fitting comprising an exterior surface, a closed end, an open end, and an interior surface, wherein the interior surface comprises a wedge system defining a cavity, wherein the wedge system comprises at least one wedge shaped portion having an arcuate apogee, a perigee, a leading edge and a trailing edge, each apogee forming an arcuate perimeter of equal dimension within the cavity that is the narrowest part of the cavity associated with each wedge shaped portion, each perigee forming a perimeter of equal dimension within the cavity that is the widest part of the cavity associated with each wedge shaped portion, such that the leading edge is longer than the trailing edge with the leading edge facing the open end and the trailing edge facing the closed end with respect to each wedge shaped portion;

engaging an end of a fiber composite rod into the cavity of the end fitting for creating a symmetrical void between the fiber composite rod and the wedge shaped portions of the end fitting whereby the symmetrical void has symmetry along the longitudinal axis of the fiber composite rod; and injecting an epoxy into the void to bond with the fiber composite rod and to fixedly engage the wedge shaped portions of the wedge system of the end fitting for securing the end fitting to the fiber composite rod such that the epoxy is uniform in thickness between the wedge shaped portions and the fiber composite rod whereby the maximum thickness and the minimum thickness are constant, such that a force differential along the wedge system is created having compressive forces greater at the closed end of the fitting and decreasing toward the open end of the fitting.

24. The method for manufacturing a sucker rod of claim 23, further comprising the step of creating different compressive forces on each respective surface of the wedge shaped portions with the compressive force inversely proportional to the length of each leading edge.

25. The method for manufacturing a sucker rod of claim 24, further comprising the step of the compressive force on each surface increasing from the open end to the closed end.

26. The method for manufacturing a sucker rod of claim 25, wherein the compressive force on each leading edge is inversely proportional to the length of each trailing edge.

27. The method for manufacturing a sucker rod of claim 23, wherein the perigee of the at least one wedge shaped portion defines an obtuse angle.

28. The method for manufacturing a sucker rod of claim 23, wherein the arcuate apogee of the at least one wedge shaped portion defines a reflex angle.

29. The method for manufacturing a sucker rod of claim 23, wherein each wedge shape has a length inversely proportional to the compressive force applied to the wedge shape.

30. The method for manufacturing a sucker rod of claim 23, wherein each wedge shape has a length that increases from the closed end to the open end of the end fitting.

31. The method for manufacturing a sucker rod of claim 23, wherein each wedge shape has a length that decreases from the closed end to the open end of the end fitting.

32. An end fitting for a sucker rod comprising:
an exterior surface, a closed end, an open end, and an interior surface, wherein the interior surface comprises a wedge system defining a cavity, wherein the wedge system comprises three wedge shaped portions each having a leading edge nearest the open end and a trailing edge nearest the closed end, wherein the leading edge is longer than the trailing edge,
wherein the three wedge shaped portions comprise a first wedge shaped portion proximate the closed end, a second wedge shaped portion proximate the first wedge shaped portion, and a third wedge shaped portion proximate the open end,
wherein the leading edge is shortest in the first wedge portion and increases progressively from the closed end to the open end thereby compensating for the compression of the sucker rod in the end fitting, and
wherein the first wedge shaped portion receives compressive forces that are greater than the compressive forces which the second wedge shaped portion receives, and the second wedge shaped portion receives compressive forces that are greater than the compressive forces which the third wedge shaped portion receives, such that the compressive forces create a force differential along the wedge system greater at the closed end of the fitting and decreasing toward the open end of the fitting, and wherein the angle between the leading edge and the trailing edge of each concaved surface is obtuse.

33. The end fitting of claim 32, wherein the wedge system creates different compressive forces on each respective wedge shaped portion thereof with the compressive force being inversely proportional to a length of each leading edge.

34. The end fitting of claim 33, wherein the compressive force on each trailing edge is inversely proportional to the length of each trailing edge.

35. The end fitting of claim 32, wherein the wedge shaped portions are determined by an angle associated with an apex between the leading edge and the trailing edge.

36. The end fitting of claim 32, further comprising a fiber composite rod having an end engaged centrally within the end fitting.

37. The end fitting of claim 36, further comprising a second end fitting engaged with a second end of the fiber composite rod.

38. The end fitting of claim 36, further comprising an epoxy placed in the cavity for bonding with the fiber composite rod in the cavity for fixedly securing the end fitting with the fiber composite rod.

39. The end fitting of claim 38, wherein the epoxy is uniform in thickness between the wedge shaped portions and the fiber composite rod such that the maximum thickness and the minimum thickness are constant.

40. The end fitting of claim 36, further comprising a beveled recess in the closed end for accepting and centrally aligning the fiber composite rod within the end fitting.

41. A sucker rod comprising:
a fiber composite rod having a first end and a second end; and
end fittings on each end of the fiber composite rod for coupling together a plurality of fiber composite rods, the end fitting comprising:
an exterior surface, a closed end, an open end, and an interior surface, wherein the interior surface comprises a wedge system defining a cavity, wherein the wedge system comprises three wedge shaped portions each having a leading edge facing the open end and a trailing edge facing the closed end, wherein the leading edge is longer than the trailing edge,
wherein the three wedge shaped portions comprise a first wedge shaped portion proximate the closed end, a second wedge shaped portion proximate the first wedge shaped portion, and a third wedge shaped portion proximate the open end,
wherein the leading edge is shortest in the first wedge shaped portion and increases progressively from the closed end to the open end thereby compensating for the compression of the sucker rod in the end fitting,
wherein the first wedge shaped portion receives compressive forces that are greater than the compressive forces which the second wedge shaped portion receives, and the second wedge shaped portion receives compressive forces that are greater than the compressive forces which the third wedge shaped portion receives, such that the compressive forces create a force differential along the wedge system greater at the closed end of the fitting and decreasing toward the open end of the fitting, and wherein the epoxy is uniform in thickness between the wedge shaped portions and the fiber composite rod such that the maximum thickness and the minimum thickness are constant.

42. The sucker rod of claim 41, wherein the wedge system creates different compressive forces on each respective wedge shaped portion thereof with the compressive force being inversely proportional to a length of each leading edge.

43. The sucker rod of claim 42, wherein the compressive force on each trailing edge is inversely proportional to the length of each trailing edge.

44. The sucker rod of claim 41, wherein the wedge shaped portions are determined by an angle associated with an apex between the leading edge and the trailing edge.

45. The sucker rod of claim 44, wherein the angle between the leading edge and the trailing edge of each concaved surface is obtuse.

46. The sucker rod of claim 41, wherein each end of the fiber composite rod is engaged centrally within the end fitting.

47. The sucker rod of claim 46, further comprising an epoxy placed in the cavity for bonding with the fiber composite rod in the cavity for fixedly securing the end fitting with the fiber composite rod.

48. The sucker rod of claim 46, further comprising a beveled recess in the closed end for accepting and centrally aligning the fiber composite rod within the end fitting.

49. A sucker rod comprising:
a fiber composite rod having a first end and a second end; and
end fittings on each end of the fiber composite rod for coupling together a plurality of fiber composite rods, at least one end fitting comprising:
an exterior surface, a closed end, an open end, and an interior surface, wherein the interior surface comprises a wedge system defining a cavity, wherein the wedge system comprises an interior wedge shaped portion proximate the closed end, at least one intermediate wedge shaped portion between the interior wedge shaped portion and an exterior wedge shaped portion proximate the open end, each wedge shaped portion having a leading edge facing the open end and a trailing edge facing the closed end,
wherein the leading edge of the interior wedge shaped portion is shorter than the leading edge of each intermediate wedge shaped portion, the leading edge of each intermediate wedge shaped portion is shorter than the leading edge of the exterior wedge shaped portion, and the leading edge length increases progressively from the closed end to the open end thereby compensating for the compression of the sucker rod in the end fitting, and
wherein the interior wedge shaped portion receives compressive forces that are greater than the compressive forces which each intermediate wedge shaped portion receives, and each intermediate wedge shaped portion receives compressive forces that are greater than the compressive forces which the exterior wedge shaped portion receives, such that the compressive forces create a force differential along the wedge system greater at the closed end of the fitting and decreasing toward the open end of the fitting, wherein the compressive force on each trailing edge is inversely proportional to the length of each trailing edge.

50. The sucker rod of claim 49, wherein the wedge system creates different compressive forces on each respective wedge shaped portion thereof with the compressive force being inversely proportional to a length of each leading edge.

51. The sucker rod of claim 49, wherein the wedge shaped portions are determined by an angle associated with an apex between the leading edge and the trailing edge.

52. The sucker rod of claim 51, wherein the angle between the leading edge and the trailing edge of each concaved surface is obtuse.

53. The sucker rod of claim 49, wherein each end of the fiber composite rod is engaged centrally within the end fitting.

54. The sucker rod of claim 53, further comprising an epoxy placed in the cavity for bonding with the fiber composite rod in the cavity for fixedly securing the end fitting with the fiber composite rod.

55. The sucker rod of claim 54, wherein the epoxy is uniform in thickness between the wedge shaped portions and the fiber composite rod such that the maximum thickness and the minimum thickness are constant.

56. The sucker rod of claim 53, further comprising a beveled recess in the closed end for accepting and centrally aligning the fiber composite rod within the end fitting.

57. The sucker rod of claim 49, wherein a ratio of the trailing edge to the leading edge of the interior wedge shaped portion is larger than a ratio of the trailing edge to the leading edge of each subsequent adjacent trailing edge to leading edge ratio.

58. A method for manufacturing a sucker rod comprising the steps of:
constructing an end fitting comprising an exterior surface, a closed end, an open end, and an interior surface, wherein the interior surface comprises a wedge system defining a cavity, wherein the wedge system comprises an interior wedge shaped portion, at least one intermediate wedge shaped portion and an exterior wedge shaped portion, each wedge shaped portion having a leading edge facing the open end and a trailing edge facing the closed end;
engaging an end of a fiber composite rod into the cavity of the end fitting for creating a symmetrical void between the fiber composite rod and the wedge shaped portions of the end fitting, whereby the symmetrical void has symmetry along the longitudinal axis of the fiber composite rod; and
injecting an epoxy into the void to bond with the fiber composite rod and to fixedly engage the wedge shaped portions of the wedge system of the end fitting for securing the end fitting to the fiber composite rod such that the epoxy is uniform in thickness between the wedge shaped portions and the fiber composite rod, whereby the maximum thickness and the minimum thickness are constant, wherein the interior wedge shaped portion receives compressive forces that are greater than the compressive forces which the intermediate wedge shaped portion receives, and the intermediate wedge shaped portion receives compressive forces that are greater than the compressive forces which the exterior wedge shaped portion receives, such that the compressive forces create a force differential along the wedge system greater at the closed end of the fitting and decreasing toward the open end of the fitting.

59. The method for manufacturing a sucker rod of claim 58 further comprising the step of creating different compressive forces on each respective surface of the wedge shaped portions.

60. The method for manufacturing a sucker rod of claim 59, further comprising the step of the compressive force on each surface increasing toward the closed end and decreasing toward the open end.

61. The method for manufacturing a sucker rod of claim 60, wherein the compressive force on each leading edge is inversely proportional to the length of each leading edge.

62. The method for manufacturing a sucker rod of claim 61, wherein the compressive force on each trailing edge is inversely proportional to the length of each trailing edge.

63. The method for manufacturing a sucker rod of claim 58, wherein the plurality of wedge shaped portions are determined by the angle associated between the first surface and the second surface of each concaved surface, the angle in the first wedge shaped portion being more acute than in the second wedge shaped portion, and the angle in the second wedge shaped portion being more acute than in the third wedge shaped portion.

64. The method for manufacturing a sucker rod of claim 63, wherein the angle between the first surface and the second surface of each concaved surface is obtuse.

65. The method for manufacturing a sucker rod of claim 58, wherein each wedge shaped portion has a length along the fiber composite rod inversely proportional to the compressive force applied to the wedge shaped portion.

66. The method for manufacturing a sucker rod of claim 58, wherein each wedge shaped portion has a length along the fiber composite rod that increases from the closed end to the open end of the end fitting.

67. The method for manufacturing a sucker rod of claim 58, wherein each wedge shaped portion has a length along the fiber composite rod that decreases from the closed end to the open end of the end fitting.

68. An end fitting for a sucker rod comprising:
an exterior surface, a closed end, an open end, and an interior surface, the interior surface comprising a wedge system defining a cavity, wherein the wedge system comprises:
a first wedge shaped portion having a first leading edge, a first trailing edge, and a first angle between the first leading edge and the first trailing edge, wherein the leading edge is longer than the trailing edge, and wherein the leading edge faces the open end and the trailing edge faces the closed end; and
a second wedge shaped portion between the first wedge shaped portion and the open end, wherein the second wedge shaped portion comprises a second leading edge, a second trailing edge, and a second angle between the second leading edge and the second trailing edge, wherein the second leading edge is longer than the second trailing edge, and wherein the second leading edge faces the open end and the second trailing edge faces the closed end, wherein the second angle is smaller than the first angle such that the length of the second leading edge is greater than the length of the first leading edge, and a force differential along the wedge system is created having compressive forces greater at the closed end of the fitting and decreasing toward the open end of the fitting.

69. An end fitting for a sucker rod comprising:
an exterior surface, a closed end, an open end, and an interior surface, the interior surface comprising a wedge system defining a cavity, wherein the wedge system comprises:
a first wedge shaped portion having a first leading edge, a first trailing edge, and a first wedge length, wherein the first leading edge is longer than the first trailing edge, and wherein the first leading edge faces the open end and the first trailing edge faces the closed end; and
a second wedge shaped portion between the first wedge shaped portion and the open end, wherein the second wedge shaped portion comprises a second leading edge, a second trailing edge, and a second wedge length, wherein the second leading edge is longer than the second trailing edge, wherein the second leading edge faces the open end and the second trailing edge faces the closed end, wherein the length of the second leading edge is greater than the length of the first leading edge, and wherein the second wedge length is less than the first wedge length, such that a force differential along the wedge system is created having compressive forces greater at the closed end of the fitting and decreasing toward the open end of the fitting.

70. The end fitting of claim 69, wherein the length of the second trailing edge is greater than the length of the first trailing edge.

71. The end fitting of claim 69, wherein the ratio of the length of the first trailing edge to the length of the first leading edge is greater than the ratio of the length of the second trailing edge to the length of the second leading edge.

72. The end fitting of claim 69, further comprising a third wedge shaped portion between the second wedge shaped portion and the open end, wherein the third wedge shaped portion comprises a third leading edge, a third trailing edge, and a third wedge length, wherein the third leading edge is longer than the third trailing edge, and wherein the third leading edge faces the open end and the third trailing edge faces the closed end, and wherein the length of the third leading edge is greater than the length of the second leading edge, and wherein the third wedge length is less than the second wedge length.

73. The end fitting of claim 72, wherein the length of the third trailing edge is greater than the length of the second trailing edge.

74. The end fitting of claim 72, wherein the ratio of the length of the second trailing edge to the length of the second leading edge is greater than the ratio of the length of the third trailing edge to the length of the third leading edge.

75. The end fitting of claim 69, wherein the first wedge length, the second wedge length, or combinations thereof is inversely proportional to a compressive force received by the first wedge shaped portion, the second wedge shaped portion, or combinations thereof.

76. The end fitting of claim 69, further comprising a plurality of intermediate wedge shaped portions between the first wedge shaped portion and the second wedge shaped portion, wherein each of the plurality of intermediate wedge shaped portions comprises a leading edge and a trailing edge, wherein each of the leading edges of the plurality of intermediate wedge shaped portions faces the open end, wherein each of the trailing edges of the plurality of intermediate wedge shaped portions faces the closed end, and wherein each of the respective leading edges of the plurality of intermediate wedge shaped portions is longer than the respective trailing edges of the plurality of intermediate wedge shaped portions.

77. A sucker rod comprising:
a fiber composite rod having a first end and a second end; and
end fittings on each end of the fiber composite rod for coupling together a plurality of fiber composite rods, at least one of the end fittings comprising:
an exterior surface, a closed end, an open end, and an interior surface, wherein the interior surface comprises a wedge system defining a cavity, wherein the wedge system comprises a first wedge shaped portion having an arcuate apogee, a perigee, a first leading edge, a first trailing edge, and a first wedge length, wherein the first leading edge is longer than the first trailing edge, and wherein the first leading edge faces the open end and the first trailing edge faces the closed end;

a second wedge shaped portion between the first wedge shaped portion and a third wedge shaped portion, wherein the second wedge shaped portion comprises a second leading edge, a second trailing edge, and a second wedge length, wherein the second leading edge is longer than the second trailing edge, and wherein the second leading edge faces the open end and the second trailing edge faces the closed end; and a third wedge shaped portion between the second wedge shaped portion and the open end, wherein the third wedge shaped portion comprises a third leading edge, a third trailing edge, and a third wedge length, wherein the third leading edge is longer than the third trailing edge, and wherein the third leading edge faces the open end and the third trailing edge faces the closed end, wherein the first leading edge is shorter than the second leading edge and the second leading edge is shorter than the third leading edge, thereby compensating for the compression of the sucker rod in the end fitting, wherein the first trailing edge is shorter than the second trailing edge and the second trailing edge is shorter than the third trailing edge, thereby compensating for the back pressure associated with the sucker rod in the end fitting, wherein the ratio of the first trailing edge to the first leading edge of the first wedge shaped portion is larger than the ratio of the second trailing edge to the second leading edge of the second wedge shaped portion, and the ratio of the second trailing edge to the second leading edge of the second wedge shaped portion is larger than the ratio of the third trailing edge to the third leading edge of the third wedge shaped portion, and wherein the second wedge length is greater than the first wedge length and the third wedge length is greater than the second wedge length, such that a force differential along the wedge system is created having compressive forces greater at the closed end of the fitting and decreasing toward the open end of the fitting.

78. A method for manufacturing a sucker rod comprising the steps of:

constructing an end fitting comprising an exterior surface, a closed end, an open end, and an interior surface, wherein the interior surface comprises a wedge system defining a cavity, wherein the wedge system comprises an interior wedge shaped portion proximate to the closed end, at least one intermediate wedge shaped portion, and an exterior wedge shaped portion proximate to the open end, wherein each wedge shaped portion comprises an apex, a leading edge and a trailing edge, wherein each apex forms a perimeter of equal dimension within the cavity that is the narrowest part of the cavity associated with each wedge shaped portion such that the leading edge is longer than the trailing edge, with the leading edge facing the open end and the trailing edge facing the closed end with respect to each wedge shaped portion, wherein the interior wedge shaped portion, the at least one intermediate wedge shaped portion and the exterior wedge shape portion each comprise a wedge length, and wherein the wedge length of the interior wedge shaped portion is greater than the wedge length of the at least one intermediate wedge shaped portion, and the wedge length of the at least one intermediate wedge shaped portion is greater than the wedge length of the exterior wedge shaped portion, such that each wedge length of each subsequent wedge shape portion decreases from the closed end to the open end of the end fitting;

engaging an end of a fiber composite rod into the cavity of the end fitting for creating a symmetrical void between the fiber composite rod and the wedge shaped portions of the end fitting, whereby the symmetrical void has symmetry along the longitudinal axis of the fiber composite rod; and injecting an epoxy into the void to bond with the fiber composite rod and to fixedly engage the wedge shaped portions of the wedge system of the end fitting for securing the end fitting to the fiber composite rod such that the epoxy is uniform in thickness between the wedge shaped portions and the fiber composite rod, whereby the maximum thickness and the minimum thickness are constant, wherein the interior wedge shaped portion proximate to the closed end receives compressive forces that are greater than the compressive forces received by the at least one intermediate wedge shaped portion receives, and wherein the compressive forces received by the at least one intermediate wedge shaped portion are greater than the compressive forces received by the exterior wedge shaped portion, such that the compressive forces create a force differential along the wedge system greater at the closed end of the fitting and decreasing toward the open end of the fitting.

79. The method of claim 78, further comprising providing the leading edge of the exterior wedge shaped portion with a length greater than the length of the leading edge of the at least one intermediate wedge shaped portion and providing the leading edge of the at least one intermediate wedge shaped portion with a length greater than the length of the leading edge of the interior wedge shaped portion.

80. The method of claim 78, further comprising providing the trailing edge of the exterior wedge shaped portion with a length greater than the length of the trailing edge of the at least one intermediate wedge shaped portion and providing the trailing edge of the at least one intermediate wedge shaped portion with a length greater than the length of the trailing edge of the interior wedge shaped portion.

81. The method of claim 78, further comprising providing the exterior wedge with a first ratio of the length of the trailing edge of the exterior wedge to the length of the leading edge of the exterior wedge; providing the at least one intermediate wedge with a second ratio of the length of the trailing edge of the at least one intermediate wedge to the length of the leading edge of the at least one intermediate wedge; and providing the interior wedge with a third ratio of the length of the trailing edge of the interior wedge to the length of the leading edge of the interior wedge, wherein the first ratio is greater than the second ratio, and wherein the second ratio is greater than the third ratio.

* * * * *